United States Patent
Meyer

(10) Patent No.: US 8,235,469 B2
(45) Date of Patent: Aug. 7, 2012

(54) ADJUSTABLE BELT GUIDE FOR THE UPPER HOLD POINT OF A THREE-POINT SEAT BELT AND VEHICLE SEAT WITH INTEGRATED THREE-POINT SEAT BELT

(75) Inventor: Lutz Meyer, Kalletal (DE)

(73) Assignee: Isringhausen GmbH & Co. KG, Lemgo (DE)

( * ) Notice: Subject to any disclaimer, the term of this patent is extended or adjusted under 35 U.S.C. 154(b) by 1242 days.

(21) Appl. No.: 11/352,464

(22) Filed: Feb. 9, 2006

(65) Prior Publication Data
US 2006/0202543 A1    Sep. 14, 2006

(30) Foreign Application Priority Data
Feb. 9, 2005 (DE) .................. 10 2005 005 888

(51) Int. Cl.
*B60R 22/00* (2006.01)

(52) U.S. Cl. .................. 297/483; 297/482; 280/808

(58) Field of Classification Search .................. 297/483, 297/482; 280/808
See application file for complete search history.

(56) References Cited

U.S. PATENT DOCUMENTS

| 4,431,233 | A | * | 2/1984 | Ernst ........................ 297/483 X |
| 4,600,217 | A | * | 7/1986 | Naumann et al. ......... 297/483 X |
| 4,652,053 | A | * | 3/1987 | Mikami ........................ 297/483 |
| 6,428,106 | B1 | * | 8/2002 | Andersson .................... 297/483 |

FOREIGN PATENT DOCUMENTS

| DE | 30 07 645 A1 | 10/1981 |
| DE | 35 30 495 A1 | 3/1987 |
| DE | 38 18 920 A1 | 12/1999 |

* cited by examiner

*Primary Examiner* — Anthony D Barfield
(74) *Attorney, Agent, or Firm* — Sound Intellectual Property PLLC

(57) ABSTRACT

The invention relates to an adjustable belt guide for the upper hold point of a three-point seat belt with a directing element, via which the belt band of the three-point seat belt can be guided, with a connecting element to fix the belt guide 4 to a backrest of a vehicle seat and with an adjustment element arranged between connecting element and directing element. It is provided according to the invention that the adjustment element is developed such that the distance between the backrest, i.e. the connecting element, and the directing element is variable perpendicular to the backrest and the directing element can be fixed in various positions vis-á-vis the backrest. In addition, the invention relates to a vehicle seat with integrated three-point seat belt in which the belt band of the three-point seat belt is guided by an adjustable belt guide connected to the backrest.

10 Claims, 1 Drawing Sheet

Figure 1:
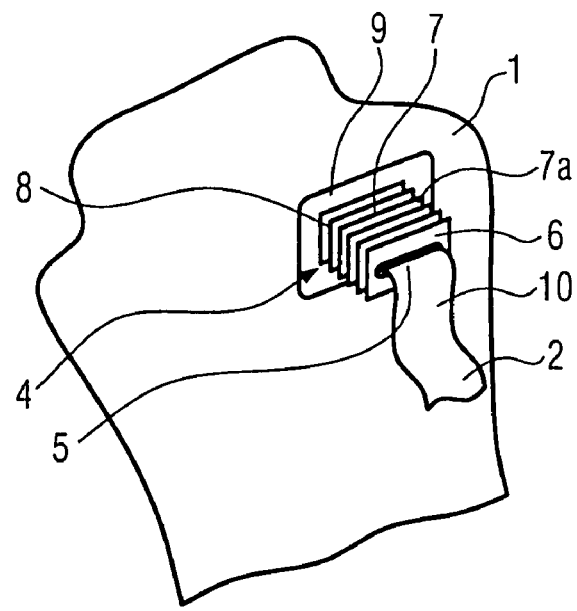

ADJUSTABLE BELT GUIDE FOR THE UPPER HOLD POINT OF A THREE-POINT SEAT BELT AND VEHICLE SEAT WITH INTEGRATED THREE-POINT SEAT BELT

CROSS-REFERENCE TO RELATED APPLICATION

This is a utility application that claims priority benefit, under 35 USC §119 (a), to German Patent Application No. 102005005888.4-22/DE, filed Feb. 9, 2005, which application is incorporated herein by reference.

BACKGROUND

The invention relates to an adjustable belt guide for the upper hold point of a three-point seat belt with a directing element via which the belt band of the three-point seat belt can be guided, with a connecting element to fix the belt guide to a backrest of a vehicle seat and with an adjustment element arranged between connecting element and directing element. In addition, the invention relates to a vehicle seat with integrated three-point seat belt, in which the belt band is guided by an adjustable belt guide connected to the backrest.

Vehicle seats which have an integrated three-point seat belt are known. This is the case in particular in the field of commercial vehicles, for example for lorries. However, in particular in the case of HGVs, the rate of seat-belt use is very low, around an estimated 30%. A common argument for not wearing a three-point seat belt is that it chafes the neck of short people. To date, this has been addressed by a vertical adjustment of the upper hold point to suit the occupant.

Devices are also known by means of which the position of the upper hold point can be adjusted laterally. For example, DE 35 30 495 A1 discloses a fitting attached to the side of the backrest of the vehicle seat parallel to the plane of the backrest. The fitting has a guide slit developed S-shaped through which the belt band of the three-point seat belt is guided. Depending on the height of the occupant, the belt band can be guided further up inside the guide slit and thus also closer to the middle of the seat or further down and thus further away from the middle of the seat.

In addition, there is known from DE 38 18 920 A1 a vehicle seat with a belt guide arranged in the shoulder area for a three-point seat belt, in which the belt guide is again arranged inside the plane of the back seat. The belt guide is developed such that it is swivellable about three axes standing orthogonally relative to each other—the vertical, the horizontal inside the backrest and the horizontal perpendicular to the backrest. Thus the angle of the belt band as guided to the occupant can be adjusted.

However, common to all known adjustable belt guides, in particular those integrated in the vehicle seat, is that the adjustment of the position of the belt guide cannot be carried out optimally for different occupants.

SUMMARY OF THE INVENTION

The object of the invention is therefore to develop an adjustable belt guide such that the adjustability of the course of the belt band of a three-point seat belt in the upper area of the diagonal belt is improved.

The object is achieved by an adjustable belt guide with the features of patent claim 1 and also a vehicle seat with the features of patent claim 7. As a result of the possibility of designing the distance between the backrest and the directing element perpendicular to the backrest to be variable, the occupant's characteristics—in particular as regards his body size—can be excellently suited. Because the directing element can be fixed at various distances, it is ensured that the occupant—regardless of his body size—can adjust the belt guide such that—without its unintentionally adjusting itself—it is optimally suited to his needs and in particular that the three-point seat belt does not chafe his neck.

An advantageous development of the invention provides that the adjustment element is developed such that the directing element is variable in a plane parallel to the backrest and the directing element can be fixed in various positions inside this plane. As a result of this additional possible movement of the directing element, not only can the changing according to the invention of the distance between the directing element the backrest be determined and fixed, but also the height of the directing element or its arrangement closer to or further away from the middle of the backrest of the vehicle seat. As a result, an even better individual adjustment of the belt guide to the build of the occupant is guaranteed.

A further advantageous development of the invention provides that the adjustment element is developed such that the directing element is rotatable about any axis or several axes. This provides a further possibility for matching the belt guide even better to the occupant's physique, as the angle at which the belt band runs from the upper hold point to the occupant's shoulder can also be optimized.

A further advantageous development of the invention provides that the adjustment element is connected to the directing element such that it is rotatable vis-á-vis the directing element about an axis of rotation. This provides a further possibility for matching the angle of the belt guide to the occupant.

A further advantageous development of the invention provides that the adjustment element is a bellows or a swan-neck. By a swan-neck within the framework of this invention is meant a bendable device which remains in position after a manual deformation—as is known for example with microphones or lights that can be used in the cigarette lighter of a motor vehicle. By a swan-neck within the framework of the invention is meant an oblong, bendable element which is manually deformable and remains in the adjusted position. As the various principles of such adjustment systems are wholly familiar to a person skilled in the art and the design of the adjustment system is not a feature of the invention, this will not be discussed in more detail. The changing according to the invention in the distance of the directing element and thus of the upper hold point of the backrest can be carried out both with such a swan-neck and also a bellows which in principle works like an accordion—but can be fixed in different positions. In addition, a very easily realizable changing of the position of the upper hold point in a plane parallel to the backrest and also a rotation about any axis according to the advantageous developments of the inventions can be carried out without difficulty.

A further advantageous development of the invention provides that the directing element surrounds the belt band in an O-shape. This ensures a good guiding of the three-point seat belt in the directing element and thus a clean fixing of the upper hold point, and the three-point seat belt cannot escape from its guide.

A further advantageous development of the invention provides that the directing element wholly surrounds the belt band and can be opened, or that the directing element does not wholly surround the belt band. As a result, the belt band can very easily be removed from the directing element for fitting or removal purposes.

A further advantageous development of the invention provides that the connecting element has connection pieces detachably connectable to a belt exit of the belt band from the backrest. Thus it is very easily possible both to replace the whole adjustable belt guide with another or to omit it completely if desired by the occupant.

A further advantageous development of the invention provides that the connecting element is connected to the belt exit of the belt band. The connecting element can be attached to the backrest in a very simple development at this point as the three-point seat belt leaves the backrest there and thus represents a good attachment point for a fixing.

A further advantageous development of the invention provides that an additional guide element is releasably attached to the directing element via which the belt band is guided. This ensures that even more individual adjustments both of the positioning and the alignment of the upper hold point are made possible.

BRIEF DESCRIPTION OF THE EMBODIMENTS

Figure 2:
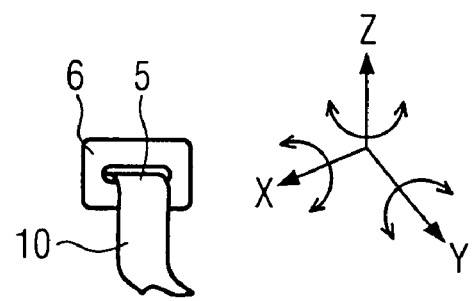
Figure 3:
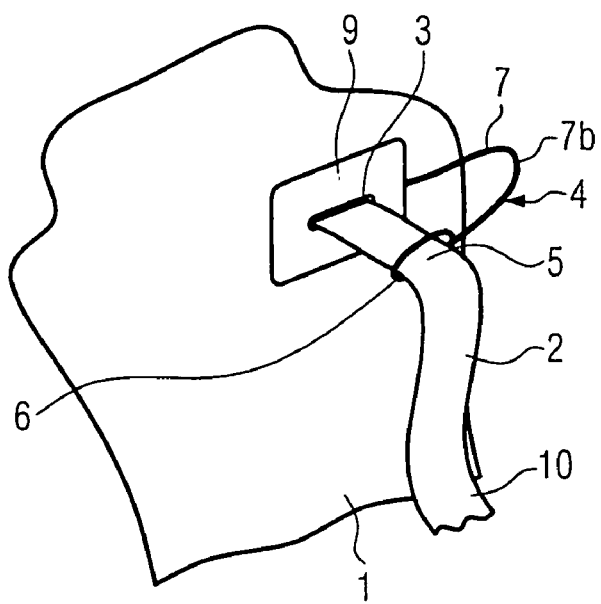

Further advantages and details of the invention are described below with reference to the embodiments shown in the figures. They show in detail:

FIG. 1 a first embodiment of an adjustable belt guide according to the invention in the form of a bellows, FIG. 2 the adjustment possibilities of the adjustable belt guide according to the invention and FIG. 3 a second embodiment of an adjustable belt guide according to the invention in the shape of a swan-neck.

DETAILED DESCRIPTION OF THE DRAWINGS

FIG. 1 is a drawing of a backrest 1 to which a first embodiment of an adjustable belt guide 4 is attached. The backrest 1 forms part of a vehicle seat which can be fitted both in a motor vehicle (be it a passenger vehicle, a bus, a lorry or other commercial vehicle) and in another means of transportation, for example an aeroplane or a railway vehicle. A three-point seat belt 2 is integrated in this vehicle seat. The belt band 10 of the three-point seat belt 2 emerges from the backrest 1 through a belt exit 3 (see FIG. 3). The belt exit 3 is formed by an exit aperture 9 which results in an aesthetically attractive vehicle seat which moreover also, in functional terms, prevents injury through sharp edges which would otherwise occur.

A belt guide 4 according to the invention is attached to the exit aperture 9. This consists essentially of three components: a connecting element 8, an adjustment element 7 and a directing element 6. The belt guide 4 is connected to the exit aperture 9 via the connecting element 8. This connection can be both releasable, for example by clicking, and non-releasable, for example by gluing, or also realized in one piece with the exit aperture 9. The adjustment element 7 joins onto the connecting element 8. In the shown embodiment, this is a bellows 7a. This is comparable with the bellows of an accordion. The directing element 6 is attached to the end of the bellows 7a facing away from the backrest.

FIG. 2 shows schematically how the directing element 6 works. This forms the upper hold point 5. Due to the adjustment element 7 developed as bellows 7a, the upper hold point 5 can be moved both perpendicular to the backrest 1 along the Y axis and also in a parallel plane to the backrest 1, the X-Z plane. In addition to these possible lateral movements of the upper hold point 5—which are due to the described possible movements along any vector within the shown cartesian coordinates system—a rotation about any axis is also possible.

Rotation about any axis can also be composed of three rotations about the respective coordinates axis of the shown cartesian coordinates system, i.e. the X-, Y- and Z-axes.

The bellows 7a is designed such that it makes possible both the lateral movement of the directing element 6 and its rotation about any axis against a force that can be applied without difficulty by an occupant. Once force is no longer applied to the bellows 7a, it maintains the position assumed at this time until force is applied again. As a result it is possible in a very simple manner for the upper hold point 5 to be brought into the position that is ergonomically most agreeable to the occupant and remain there until the occupant desires a different position of the upper hold point 5 or another occupant sits on the vehicle seat. The adjustment of the upper hold point 5 can thus take place not only inside the plane of the backrest 1—the X-Z plane—or a plane parallel thereto, which corresponds to a vertical adjustment of the upper hold point 5 or a placing of same more towards the middle or the outside of the backrest 1, but in addition also vis-á-vis the distance of the upper hold point 5 from the X-Z plane—i.e. the plane of the backrest 1. In addition, a pivoting of the upper hold point 5 is also possible, with the result that an optimal adjustment to the occupant takes place via the exit angle of the belt band 10 from the directing element 6 and also the arrangement of the directing element 6.

The second embodiment, shown in FIG. 3, of an adjustable belt guide 4 according to the invention differs only in respect of the specific design of the three components connecting element 8, adjustment element 7 and also directing element 6. Only the differences compared with FIG. 1 will therefore be discussed below. Otherwise, parts that are identical or have the same effect are given the same reference numbers.

The belt guide 4 is securely connected to the fitting aperture 9 via connecting pieces (not shown) as connecting element 8. The adjustment element 7 is designed as a swan-neck 7b instead of a bellows 7a. Its mode of operation corresponds to that of the bellows shown in FIG. 1, as here too the occupant can bend the swan-neck 7b without difficulty by a small application of force and thus both a lateral movement of the directing element 6 in any direction and also a rotation of same about any axis of rotation is possible. Here too the swan-neck 7b automatically remains in the chosen position after the application of force has ended, and can then just as easily be brought into a new position by a new application of force. Here, the directing element 6 is made as a self-contained oval from a dimensionally stable plastic. As a result, the upper hold point 5 can, exactly as in the first embodiment in FIG. 1, be very easily adjusted individually to each occupant, with the result that the latter is also happy to wear the three-point seat belt 2 because he experiences no discomfort from the belt band 10.

The invention claimed is:
1. Adjustable belt guide for the upper hold point of a three-point seat belt comprising:
   a directing element to guide a belt band of the three-point seat belt,
   a connecting element to fix the belt guide to a backrest of a vehicle seat
   and an adjustment element arranged between the connecting element and the directing element,
   characterized in that
   the directing element can linearly extend from and retract towards the backrest,
   the directing element surrounds the belt band in an O-shape, and the directing element can be fixed at various distances from the backrest.

2. Adjustable belt guide according to claim 1, characterized in that the directing element is variable in a plane parallel to the backrest and the directing element can be fixed in various positions inside this plane.

3. Adjustable belt guide according to claim 1, characterized in that the directing element is rotatable about any axis or several axes.

4. Adjustable belt guide according to claim 1, characterized in that the adjustment element is connected to the directing element such that it is rotatable vis-á-vis the directing element about an axis of rotation.

5. Adjustable belt guide according to claim 1, characterized in that the adjustment element is a bellows or a swan-neck.

6. Adjustable belt guide according to claim 1, characterized in that the directing element wholly surrounds the belt band and can be opened.

7. Adjustable belt guide according to claim 1, characterized in that the connecting element has connection pieces detachably connectable to a belt exit of the belt band from the backrest.

8. Vehicle seat with integrated three-point seat belt, in which the belt band of the three-point seat belt is guided by an adjustable belt guide connected to the backrest according to one of the previous claims.

9. Vehicle seat according to claim 8, characterized in that the connecting element is connected to the belt exit of the belt band.

10. Vehicle seat according to claim 8, characterized in that an additional guide element is releasably attached to the directing element, via which the belt band is guided.

* * * * *